Patented Mar. 14, 1939

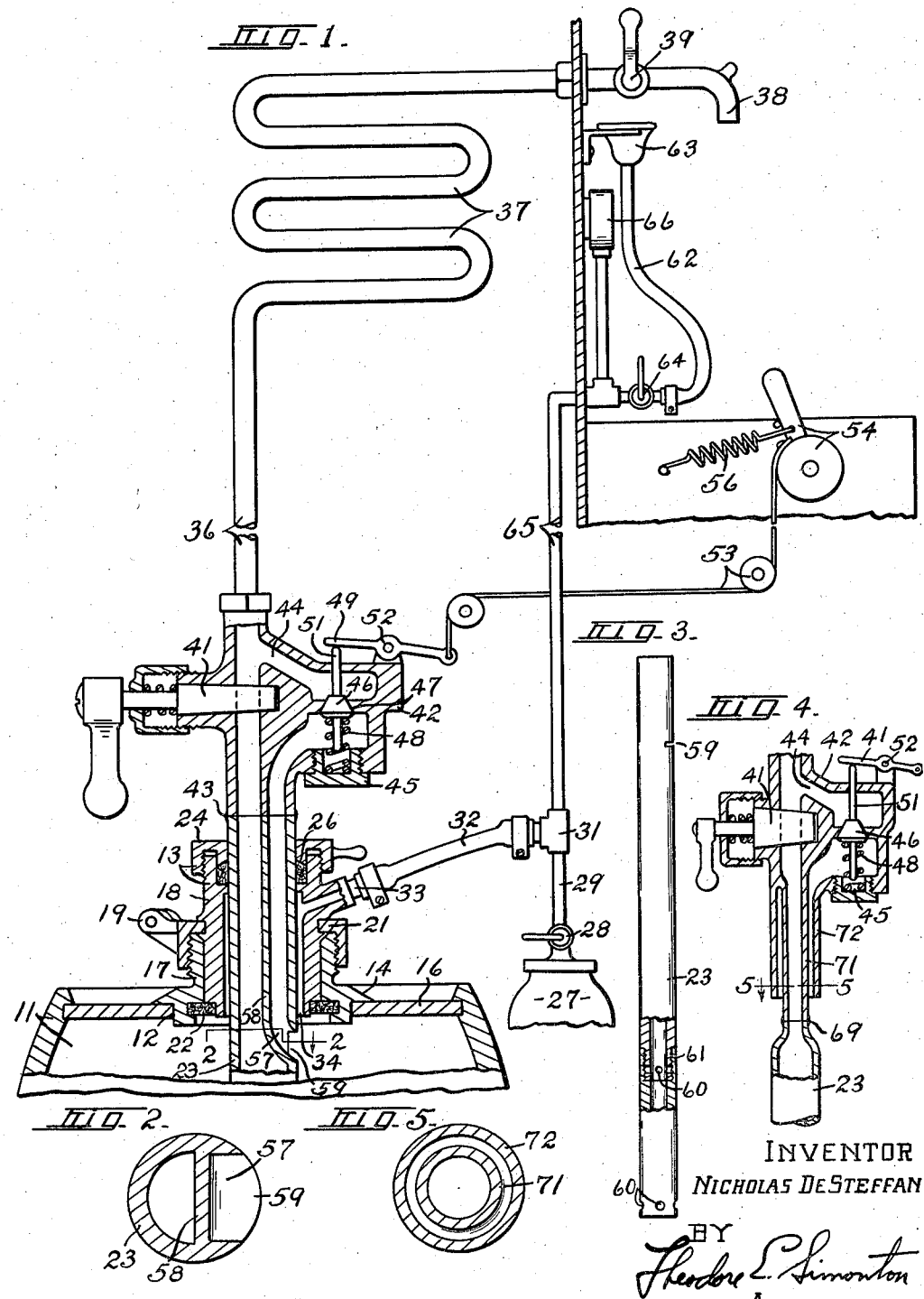

2,150,673

UNITED STATES PATENT OFFICE 2,150,673

BEVERAGE DISPENSING SYSTEM

Nicholas De Steffan, Syracuse, N. Y.

Application March 3, 1938, Serial No. 193,731

4 Claims. (Cl. 225—1)

My invention relates generally to a system for dispensing beverages and, more particularly, to a system for dispensing beverages such as beer or ale.

In a system for dispensing a beverage such as beer or ale, the beverage is usually drawn from a supply reservoir such as a barrel or keg located below the dispensing level and forced through a conduit, including cooling coils, by pressure from the lower level to the higher level. When the system is to be temporarily shut down a valve adjacent the barrel is closed and the beer in the conduit and cooling coils is retained therein. The beer or other beverage has a tendency to react with the coil and foul the system. It is therefore necessary to drain and thoroughly flush the distributing lines at frequent intervals, usually daily, in order to clean the system. Moreover, the beer deteriorates and becomes flat on standing or remaining for any appreciable time, such as overnight, in contact with the metallic surfaces of the cooling coils. After periods of temporary shut-down all of the beer in the cooling coils must be drawn off and wasted before fresh live beer may be drawn through the system from the barrel. This loss of the beverage, as well as the time consumed and difficulty involved in cleaning out the distributing system, adds appreciably to the cost of dispensing beverages.

While I am aware that various methods have been proposed for returning the beverage from the conduit and the cooling coils back to the barrel, in all of these systems the beverage is returned to the bottom of the barrel or other receptacle and, as there is a considerable quantity of beverage returned to the barrel when the system is shut down, the sediment at the bottom of the barrel becomes stirred up and the beverage roily.

An object of my invention is to provide a dispensing system for beer, ale or the like which is simple, inexpensive and easy to operate.

Another object of my invention is the provision of attachments which may be readily added to the present commercially employed systems of dispensing beer, ale or the like to provide a complete system for dispensing the beverage, returning the beverage from the cooling coils back to the barrel or other beverage container upon shutting down the system and for enabling convenient cleaning of the system.

A further object of my invention is the provision of a system for dispensing beverages wherein the cooling coils may be cleaned conveniently and in a minimum of time.

My invention further contemplates a system of dispensing beverages wherein upon shutting down the system the beverage is returned to the source of supply at the top thereof with a consequent saving of the beverage normally wasted and a decrease in the usual frequency of cleaning the system.

Other objects and advantages of my invention will become apparent from the following description when taken in connection with the accompanying drawing, in which:

Figure 1 is a diagrammatic view, partly in section, showing my beverage dispensing system.

Figure 2 is a view taken on the line 2—2 of Figure 1.

Figure 3 is a view showing the tube or beer tap which extends into the barrel.

Figure 4 is a modification of the structure shown in Figures 1 and 2.

Figure 5 is a view taken on line 5—5 of Figure 4.

While the system of dispensing beverages, in which my invention is incorporated, may be employed in the dispensing of various beverages, it is particularly adapted to dispensing beer, ale or like products. The beer is usually contained in a keg or barrel 11, the top of which has an opening 12 for normally receiving a bung. When a barrel of beer is to be tapped, the bung is removed and a fitting, generally indicated by the numeral 13, is driven into the bung opening until the flange 14 formed on the fitting butts against the top 16 of the barrel. The fitting 13, which is of the standard construction now very largely commercially employed, comprises two parts 17 and 18 which are concentric with each other and a nut 19 threaded on the part 17. A flange 21 on the nut lies in a groove formed on the part 18 so that when the nut is screwed downward the part 18 is drawn down into air-tight sealing engagement with an annular rubber ring 22 carried by the part 17.

A tube or beer tap 23 extends downward into the barrel to substantially the bottom thereof and is concentric with the part 18 of the fitting 13. A nut 24 threaded on the part 18 is adapted to be screwed downward to compress packing 26 against the tube and form an air-tight seal. A tank 27, containing air or any other suitable gas, may be supplied with air under pressure from a compressor (not shown). The tank has a shut-off valve 28 and a conduit 29 extending from the top thereof. In the conduit 29 is a T 31 adapted to be connected by a flexible connection 32 to a nipple 33 extending from the fitting 13. An annular passage 34 is formed around the tube between the tube and the part 18 of the fitting so that when the valve 28 is opened air, under pressure, is admitted to the top of the barrel. The pressure usually employed, although this will depend upon circumstances, is about fifteen pounds per square inch. The pressure of air creates a pressure chamber at the top of the barrel and causes the liquid to flow up through the tube 23 into the tube 36 and cooling coil 37 to the discharge spout or spigot 38. A valve 39 is used to start and stop the flow of beer.

In the usual beer dispensing system now commercially employed, when the system is to be shut down for the night or for other purposes, a shut-off valve 41 in the line is closed and the beer in the tube 36 and cooling coil 37 is retained therein until the next morning. When the bartender arrives in the morning, he opens the valve 41 and draws off the beer which has lain stagnant overnight in the tube and the cooling coil. This beer is not only wasted but also the beer has a deleterious effect on the tubes of the cooling coil necessitating that they be cleaned at frequent intervals, usually daily.

In my invention, a fitting 42, in which the shut-off valve 41 may be located, is welded or otherwise secured to the top of the tube 23, as indicated at 43. The fitting 42 is provided with a by-pass 44 which is closed by a valve 46 adapted to engage a seat 47 formed in the fitting 42. The valve 46 may be normally urged toward its seat by a spring 48 confined in the fitting as indicated at 45. The valve may be opened against the spring pressure by engaging a lever 49 with a stem 51 protruding from the fitting and formed integral with the valve 46. The lever 49, which may be pivoted at 52, may be operated in any suitable manner as by a cord and pulley system generally indicated by the numeral 53. A rotatable hand lever 54, to which the cord of the pulley system is secured, is normally held by a spring 56 in a position such that the valve is held closed by the spring 48. The by-pass 44 is connected to a passage 57 formed in the tube 23 by welding a partition 58 in the tube. The tube 23 is also provided with an opening 59 which connects the passage 57 with the pressure chamber at the top of the barrel. The tube 23 is shown in Figure 3 and is of such length as to extend substantially to the bottom of the barrel and at the bottom thereof are formed a plurality of apertures 60 by which the beer enters the tube. It will be noted that the tube is in two parts threaded together, as indicated at 61. When the lower part of the tube is removed, the tube is of the proper length to be used with a half barrel of beer.

When a new barrel of beer is to be tapped, the bung is removed and the fitting 13 inserted in the bung opening and the nut 19 is screwed down. The tube 23, including the fitting 42, is then placed in position by inserting the end of the tube in the fitting opening until the end of the tube is adjacent the bottom of the barrel. The nut 24 is then screwed down so that a seal is formed by the packing 26. After the cooling coil has been connected to the fitting 42, the valve 28 is opened, admitting air under pressure to the top of the barrel, after which the valve 41 may be opened permitting the air pressure to force the beer up through the coil 37. Beer may then be drawn out of the spigot 38 upon opening of the valve 39. At night, when the bartender closes, he goes down to the basement, where the barrels of beer are usually located and closes the valve 41. He then connects a flexible hose 62, having a rubber cup 63, to the end of the spigot 38. Then, upon opening the valve 64 in an extension 65 of the line 29, the valve 46 and the valve 39, the pressure on opposite ends of the cooling coil 37 is equalized. The beer in the cooling coil will then flow by gravity through the by-pass 44, valve 46 and the passage 57 into the pressure chamber at the top of the barrel. The valve 46 is then permitted to close. A gauge 66, within view of the bartender, shows the pressure in the system.

If desired, with the valves 41 and 46 closed, the hose 62 may be detached from the spigot 38 and a hose, connected to a source of water supply or to a source of tube cleansing fluid, may be attached to the spigot 38 and water or tube cleansing fluid run into the cooling coil and permitted to stand there overnight. In the morning, the bartender may open the valve 46 and the valve 39, and force the water or cleansing fluid out of the tube cooling coils by the pressure of air in the pressure chamber of the barrel. After the water or tube cleansing fluid has issued from the spigot, upon closing the valve 46 and opening the valve 41, he may, without waste, sell the first beer flowing out of the spigot. It will be particularly noted that the beer is returned to the top of the barrel and is under pressure so that it remains fresh and lively.

In Figures 4 and 5, I have shown a modification of my invention wherein the tube 23 is welded, as indicated at 69, to a tube 71 which is formed as part of the fitting 42. A tube 72, encircling and spaced from the tube 71, forms an annular passageway for the return of beer through the by-pass 44. The tube assembly is inserted in the barrel so that the cover of the barrel lies about at the section line 5—5.

It will be appreciated that I have provided a novel dispensing system for beverages wherein during periods of temporary shut-down the beer in the cooling coils may be returned to the top of the barrel, and I have also provided simple means for flushing out the cooling coils. It will further be appreciated that various changes may be made in the form and relation of the parts without departing from the spirit of the appended claims.

I claim:

1. In a system for dispensing a beverage from a barrel or the like, a beverage conduit comprising a refrigerating coil having a discharge spout from which the beverage is drawn off and a tube extending into the barrel to a point adjacent the bottom thereof, means for admitting a gas under pressure into the barrel at the top thereof to form a pressure chamber at the top of the barrel to thereby force the beverage from the barrel through said conduit and out of the discharge spout, a valve in said conduit between the refrigerating coil and the barrel, said valve being normally open but being adapted to be closed when the system is to be temporarily shut down, and means comprising a by-pass for returning the beverage in the refrigerating coil to the top of the barrel when such periods of shut-down occur.

2. In a system for dispensing a beverage from a barrel or the like, a beverage conduit comprising a refrigerating coil having a discharge spout from which the beverage is drawn off and a tube extending into the barrel to a point adjacent the bottom thereof, means for admitting a gas under pressure into the barrel at the top thereof to form a pressure chamber at the top of the barrel to thereby force the beverage from the barrel through said conduit and out of the discharge spout, a shut-off valve in said conduit between the refrigerating coil and the barrel, said valve being normally open but being adapted to be closed when the system is to be temporarily shut down, means including a by-pass having a valve for returning the beverage in the refrigerating coil to the top of the barrel, and means for equalizing the pressures on opposite ends of said refrigerating coil whereby the beer flows by gravity back to the barrel.

3. In a system for dispensing beverages from a barrel or the like, a beverage conduit comprising a tube extending into the barrel to a point adjacent the bottom thereof, a refrigerating coil operatively connected to said tube, a discharge spout operatively connected to said refrigerating coil, said discharge spout having a valve, a shut-off valve in said conduit between said refrigerating coil and the barrel, a fitting secured in the top of the barrel and encircling said tube, said fitting having a conduit therein connected to a source of gas under pressure, said conduit opening into the top of the barrel to form a pressure chamber in the barrel above the level of the beverage to maintain the beverage under pressure and force the beverage upward through said first conduit, a by-pass having a valve, said by-pass being between said refrigerating coil and the pressure chamber at the top of the barrel, means for connecting said spout to the source of gas pressure so that when said shut-off valve is closed and said spout valve and by-pass valves are opened the pressures on opposite ends of the refrigerating coil are equalized so that the beverage in the refrigerating coil may flow back into the top of the barrel through said by-pass by gravity.

4. A fitting for use in a system for dispensing beverages and being adapted to be inserted in the bung opening at the top of a beverage barrel, said fitting comprising an annular part, a tube extending to a point adjacent the bottom of the barrel and being encircled by said annular part, a conduit through said fitting for admitting a gas to the top of the barrel under pressure, a shut-off valve for stopping the flow of beverage upward through said tube, a by-pass around said shut-off valve and a conduit through said fitting opening into the top of the barrel and connected to said by-pass.

NICHOLAS DE STEFFAN.